US010772459B2

(12) United States Patent
Diamanti et al.

(10) Patent No.: US 10,772,459 B2
(45) Date of Patent: Sep. 15, 2020

(54) APPARATUS FOR MAKING A BEVERAGE, IN PARTICULAR FOR A BEVERAGE CONTAINING MILK

(71) Applicant: CAFFITALY SYSTEM S.P.A., Gaggio Montano (BO) (IT)

(72) Inventors: Maurizio Diamanti, Castel di Casio (IT); Valeriy Chanine, Monza (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 297 days.

(21) Appl. No.: 16/061,379

(22) PCT Filed: Nov. 23, 2016

(86) PCT No.: PCT/IB2016/057055
§ 371 (c)(1),
(2) Date: Jun. 12, 2018

(87) PCT Pub. No.: WO2017/103709
PCT Pub. Date: Jun. 22, 2017

(65) Prior Publication Data
US 2018/0353000 A1    Dec. 13, 2018

(30) Foreign Application Priority Data
Dec. 17, 2015 (IT) .................. 102015000084746

(51) Int. Cl.
*A47J 31/44* (2006.01)
(52) U.S. Cl.
CPC ....... *A47J 31/4485* (2013.01); *A47J 31/4489* (2013.01)
(58) Field of Classification Search
CPC ............... A47J 31/4485; A47J 31/4489; A47J 31/4496; A47J 27/57; A47J 43/12
See application file for complete search history.

(56) References Cited

U.S. PATENT DOCUMENTS

| 3,079,208 A | 2/1963 | Compton |
| 7,946,219 B2 | 5/2011 | Marconi |

(Continued)

FOREIGN PATENT DOCUMENTS

| EP | 0069187 A1 | 1/1983 |
| EP | 1725151 B1 | 4/2010 |

(Continued)

*Primary Examiner* — Christopher M Koehler
*Assistant Examiner* — Kyle A Cook
(74) *Attorney, Agent, or Firm* — Pearne & Gordon LLP

(57) ABSTRACT

This disclosure relates to an apparatus (1) for making a beverage, in particular a beverage containing milk. The apparatus (1) comprises a machine body, a milk container (2) and a milk frothing device (3) for mixing milk with air and steam. The milk frothing device (3) is removably mountable in a seat (10) in an outer wall (11) of the machine body. The milk container (2) is removably couplable to the milk frothing device (3). The apparatus (1) also comprises a locking member (5) for locking the milk frothing device (3) in the mounted condition. The milk container (2) interacts with the locking member (5) in such a way that, when the milk container (2) is coupled to the milk frothing device (3) in the mounted condition, the locking member (5) is active and prevents removal of the milk frothing device (3) from the seat (10), and in such a way that, when the milk container (2) is uncoupled from the milk frothing device (3), the locking member (5) may adopt the inactive condition for allowing removal of the milk frothing device (3) from the seat (10). Therefore, the milk frothing device (3) and the milk container (2) in the coupled condition are not simultaneously removable from the machine body.

20 Claims, 6 Drawing Sheets

(56) References Cited

U.S. PATENT DOCUMENTS

| | | |
|---|---|---|
| 2007/0243305 A1 | 10/2007 | Marconi |
| 2015/0335195 A1 | 11/2015 | Beaudet et al. |
| 2016/0270589 A1 | 9/2016 | Tonelli et al. |
| 2016/0287009 A1* | 10/2016 | Zhong ................ A47J 31/4489 |
| 2016/0296063 A1 | 10/2016 | Ferraro et al. |
| 2017/0127876 A1* | 5/2017 | Van Eeden ......... A47J 31/4485 |
| 2017/0164781 A1* | 6/2017 | De'Longhi ......... A47J 31/4485 |
| 2018/0103792 A1* | 4/2018 | De'Longhi ......... A47J 31/4489 |

FOREIGN PATENT DOCUMENTS

| | | |
|---|---|---|
| EP | 2946706 A1 | 11/2015 |
| FR | 2906990 A3 | 4/2008 |
| IT | 1142687 | 10/1986 |
| WO | 2005102126 A2 | 11/2005 |
| WO | 2014162262 A1 | 10/2014 |
| WO | 2015078858 A1 | 6/2015 |

* cited by examiner

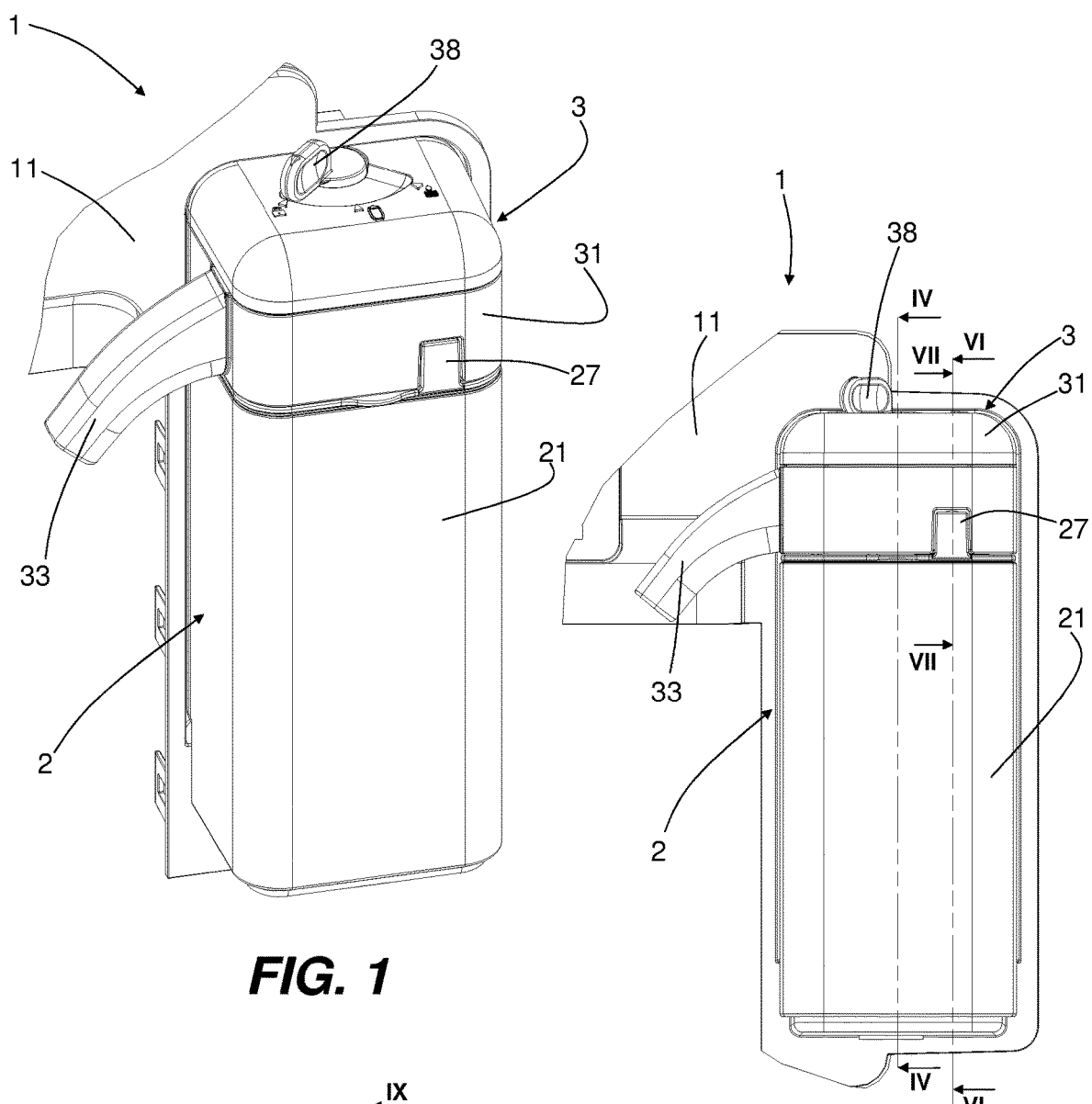
FIG. 1
FIG. 2
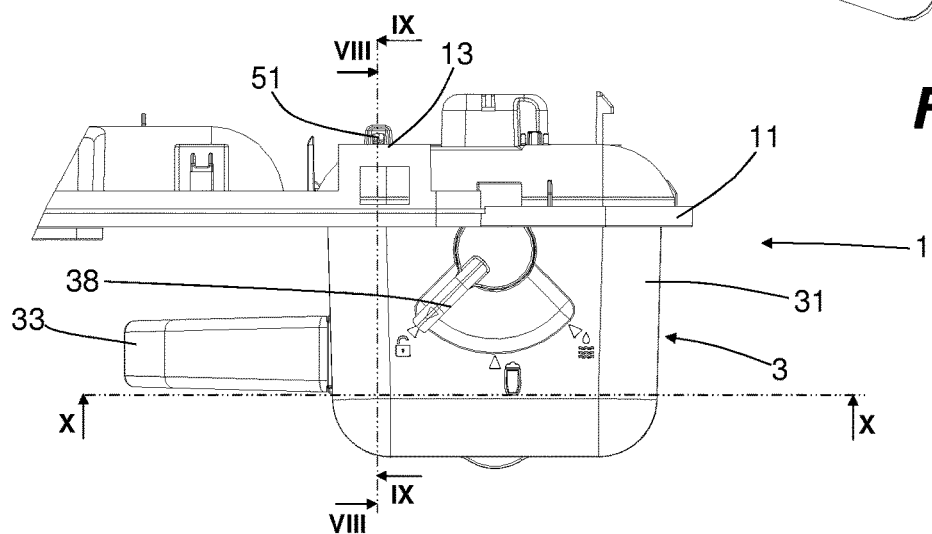
FIG. 3

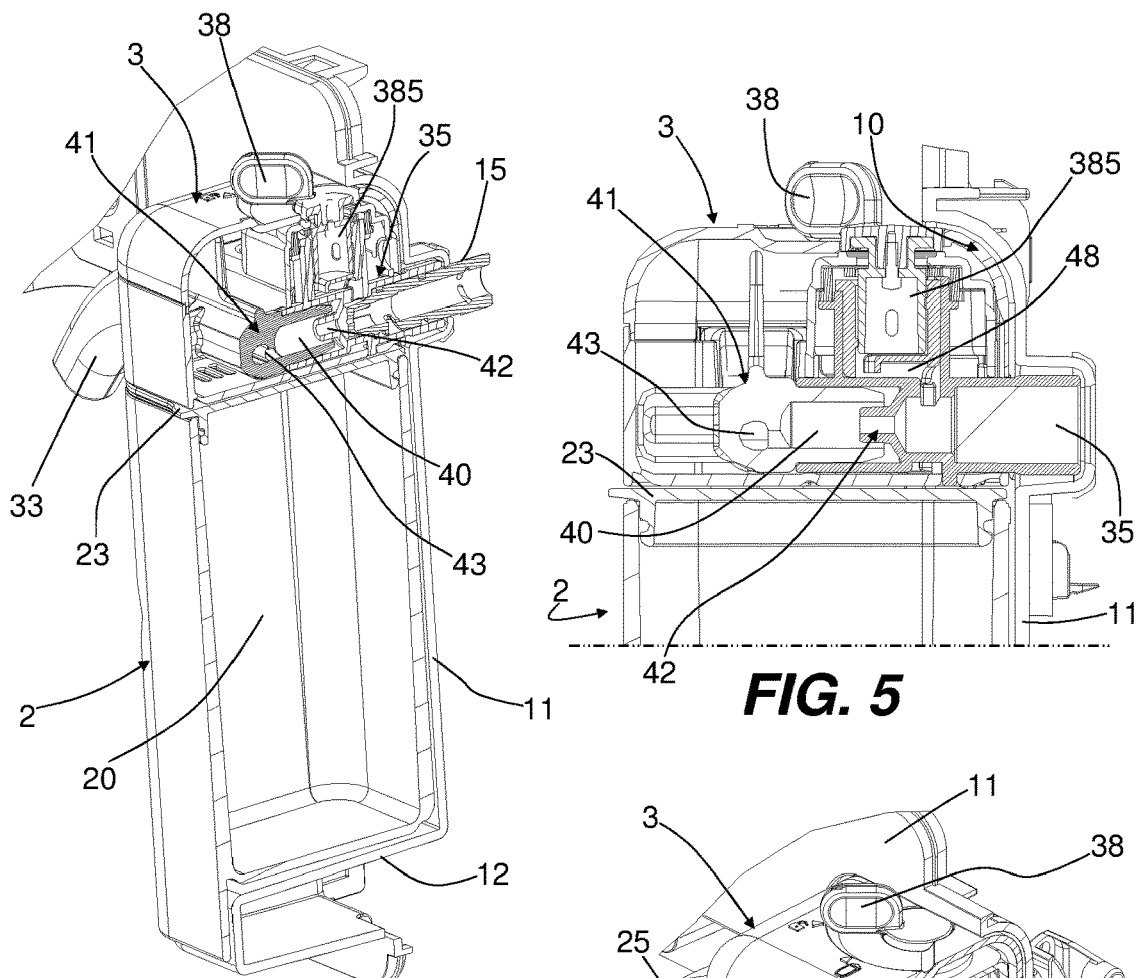
FIG. 4
FIG. 5
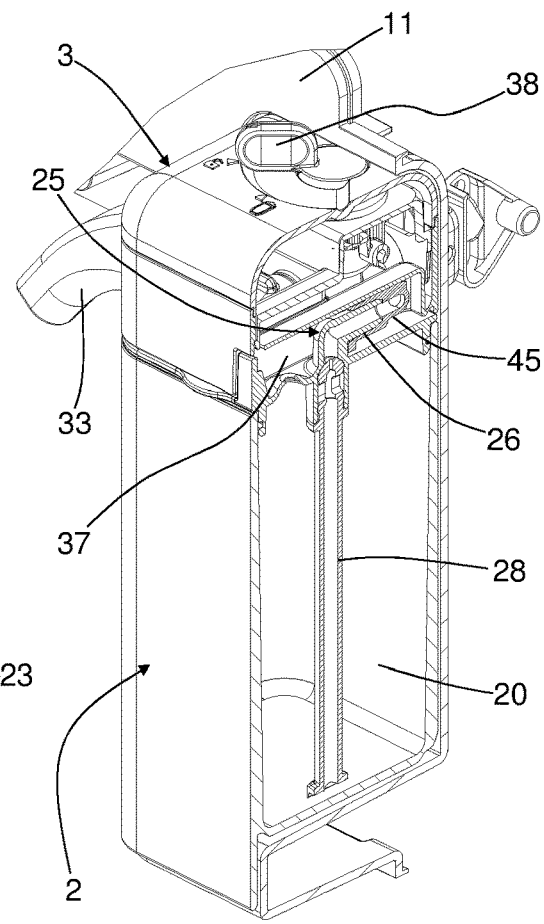
FIG. 7
FIG. 6

APPARATUS FOR MAKING A BEVERAGE, IN PARTICULAR FOR A BEVERAGE CONTAINING MILK

This invention relates in general to the beverage making sector. In particular, this invention relates to an apparatus for making a beverage containing milk, for example a frothed milk or a cappuccino.

There are prior art apparatuses equipped with a milk frothing device designed for mixing milk, steam and air to obtain frothed milk.

In some prior art apparatuses, for example in the apparatus described in European patent No. EP1725151, there is a milk container equipped with a cover in which the milk frothing device is located. The milk container is removably mounted on the outside of the apparatus. In the mounted condition, a manifold body of the milk frothing device is engaged on a steam dispenser that projects from an outer face of the apparatus. Therefore, the milk frothing device can receive steam from a boiler of the apparatus and suck milk from the container below. The container and its cover, with the milk frothing device incorporated in the latter, can be mounted on and removed from the apparatus simultaneously, as if they were a single body.

One disadvantage of that prior art apparatus is linked to the risk that, during removal of the milk container, the user may be accidentally struck by a jet of steam coming from the steam dispenser which is left uncovered and pointing towards the user after removal of the container.

In this context, the technical purpose that forms the basis of this invention is to provide an apparatus for making a beverage, in particular a beverage containing milk, in which that apparatus reduces the risk linked to said disadvantage or at least offers an alternative solution to the prior art apparatuses.

The technical purpose specified and the aims indicated are substantially achieved by an apparatus for making a beverage according to claim 1.

Particular embodiments of this invention are defined in the corresponding dependent claims.

According to one aspect of the solution proposed by this invention, the apparatus comprises a milk container and a milk frothing device which are both removably mountable on the outside of a machine body of the apparatus. In the mounted condition, the milk container is removable separately from the milk frothing device and, moreover, the apparatus comprises a locking member that is activated by the presence of the milk container, in order to prevent removal of the milk frothing device simultaneously with removal of the milk container.

Therefore, in an apparatus according to this invention, the milk container is removable in such a way that the milk frothing device is left in position. The milk frothing device is, in turn, removable, if necessary, only after the milk container has been removed.

Further features and the advantages of this invention are more apparent in the detailed description below, with reference to an example, non-limiting embodiment of an apparatus for making a beverage. Reference will be made to the accompanying drawings, in which:

FIG. 1 is a perspective view of a portion of an apparatus according to this invention;

FIG. 2 is a front view of the portion of apparatus of FIG. 1;

FIG. 3 is a top view of the portion of apparatus of FIG. 1;

FIG. 4 is a perspective view of the portion of apparatus of FIG. 1, in section according to a section plane IV-IV in FIG. 2;

FIG. 5 is an enlarged side view of a detail of the sectional view of FIG. 4, with some parts removed;

FIG. 6 is a perspective view of the portion of apparatus of FIG. 1, in section according to a section plane VI-VI in FIG. 2;

FIG. 7 is an enlarged side view of a detail of the portion of apparatus of FIG. 1, in section according to a section plane VII-VII in FIG. 2;

Figure 8:
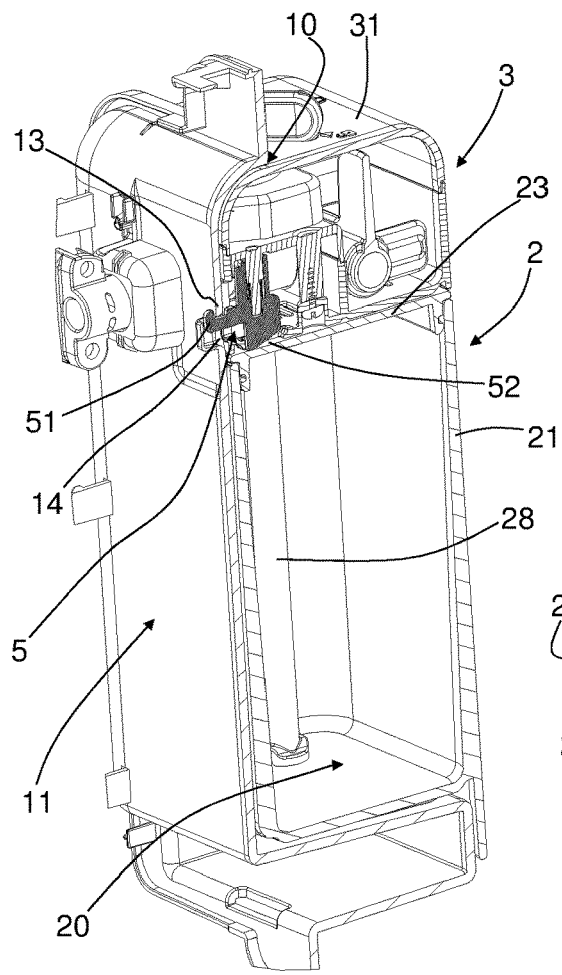
FIG. 8 is a perspective view of the portion of apparatus of FIG. 1, in section according to a section plane VIII-VIII in FIG. 3.

An apparatus according to this invention is labelled with the reference numeral 1 and can be used for making a beverage containing milk, for example a frothed milk or a cappuccino. The whole apparatus 1 is not illustrated. Instead, only a portion of it relevant for the purposes of this description is shown in the figures.

The apparatus 1 comprises a machine body, of which only a portion of an outer wall 11 is shown in the figures. The machine body houses or contains a boiler for producing steam, in particular pressurised steam. The apparatus 1 also comprises a milk container 2 and a milk frothing device 3.

The milk frothing device 3 includes a system for mixing milk with air and steam in order to obtain frothed milk, that is to say, foamy milk incorporating air bubbles. That mixing system can be implemented according to embodiments that in themselves are already known in the sector.

In detail, the milk frothing device 3 comprises a box-shaped body 31 containing a milk frothing chamber 40. That frothing chamber 40 is made in a manifold 41 that is connected to an air infeed duct 48, to a milk infeed duct 45 and to a steam infeed duct 35. In use, the steam infeed duct 35 is in communication with the boiler of the apparatus 1 and the milk infeed duct 45 is in communication with the milk container 2.

In particular, a nozzle 42 for the steam is interposed between the steam duct 35 and the chamber 40. The nozzle 42 has a converging section which, when it receives a flow of pressurised steam, creates a local pressure drop such that it causes milk to be sucked from the container 2 through the duct 45 and air to be sucked from the outside environment through the duct 48. In the chamber 40 the milk, air and steam are mixed, thereby producing a frothed milk.

The milk frothing device 3 also comprises a dispensing spout 33 that is connected to the chamber 40 by a respective duct 43 and is, therefore, designed to dispense the frothed milk produced in the chamber 40. The dispensing spout 33 extends laterally from the box-shaped body 31 and in particular, during use, can dispense frothed milk directly into a cup below.

In the embodiment illustrated, the milk frothing device 3 also comprises a control selector or lever 38. The lever 38 rotates together with a hollow body 385 that forms an infeed for the flow of air through the duct 48. In detail, the lever 38 is shiftable between a normal operating position, corresponding to a flow of air suitable for suction and frothing of the milk, and a cleaning position, corresponding to activation of a washing cycle using water and/or steam for cleaning the chamber 40 and the dispensing spout 33. If necessary, the washing cycle may be performed when the milk container 2 is uncoupled from the milk frothing device 3, in order to avoid sucking in milk during cleaning. The lever 38 is also shiftable to a position in which it is disengageable from the box-shaped body 31 and is removable from it to facilitate cleaning of the milk frothing device 3.

During use, the milk container 2 and the milk frothing device 3 are positioned on the outside of the machine body, in particular on an outer wall 11 that is facing a user during normal use of the apparatus 1. The outer wall 11 is provided with a seat 10 for receiving the milk frothing device 3, as well as the milk container 2. The milk frothing device 3 is removably mountable in the seat 10. In the embodiment illustrated, that seat 10 in particular is a hollow or a housing partly recessed in the outer wall 11.

Alternatively, the seat 10 may be a region of the outer wall 11 that is not hollowed out. In general, it shall be understood that the seat 10 is a region of the apparatus 1 which defines a position in which the milk frothing device 3 can be mounted for use.

As already indicated above, the machine body contains a boiler for producing the steam required for operation of the milk frothing device 3. The boiler, which practically is a steam generator, is connected to a steam dispenser 15, which is fixed to the outer wall 11 and passes through it, projecting into the seat 10.

When the milk frothing device 3 is in the mounted condition in the seat 10, the milk frothing device 3 is in communication with the boiler and, therefore, is designed to receive steam from the latter. In particular, in the mounted condition the steam infeed duct 35 is engaged on the steam dispenser 15.

In detail, the steam dispenser 15 and the steam infeed duct 35 have a substantially horizontally line of extension. Therefore, the milk frothing device 3 is mountable on or removable from the machine body with a relative movement that is also along a substantially horizontal line. For example, the milk frothing device 3 is supported in position in the seat 10 by the mechanical interaction between the duct 35 and the steam dispenser 15.

The milk container 2 comprises a box-shaped body 21 containing an inner space 20 intended to contain the milk to be frothed. A cover 23 is removably fixed on the body 21 for closing the top of the inner space 20 of the milk container 2. A pickup pipe 28 extends in the inner space 20 and substantially reaches the bottom of the body 21. The opposite end of the pickup pipe 28 is provided with a tubular connector 25 that projects from the cover 23. In detail, the tubular connector 25 is curved or L-shaped and comprises an end portion 26 that extends for a stretch substantially parallel to the cover 23, from which it has a distance. In the embodiment illustrated, the pickup pipe 28 and the tubular connector 25 are fixed to the cover 23 and, therefore, are removable with the latter.

The milk container 2 is removably couplable to the milk frothing device 3, in particular by a sliding movement of one relative to the other. In the coupled condition, the milk frothing device 3 is in communication with the milk container 2 and, therefore, is designed to receive from the latter the milk to be frothed. In detail, in the mounted condition the milk infeed duct 45 of the milk frothing device 3 is engaged on the end portion 26 of the pickup pipe 28 of the milk container 2.

In particular, when the milk frothing device 3 is mounted in the seat 10, the milk infeed duct 45 has a substantially horizontal line of extension. In the condition for use, the end portion 26 also extends substantially horizontally, therefore, the milk container 2 is couplable to or uncouplable from the milk frothing device 3 with a relative movement that is a translation along a substantially horizontal line.

In the embodiment illustrated, in the coupled condition the milk frothing device 3 is located at the top of the milk container 2. In particular, the milk frothing device 3 is positioned above the cover 23 and the box-shaped body 31 of the milk frothing device 3 substantially forms a continuation of the shape of the body 21 of the milk container 2 (in other words, the connection is also made from an aesthetic viewpoint).

The bottom of the box-shaped body 31 of the milk frothing device 3 comprises a groove or sunken track 37, at the end of which the milk infeed duct 45 is located. The groove 37 extends along a substantially horizontal line and receives in it the tubular connector 25 that projects from the cover 23 of the milk container 2. During the relative coupling or uncoupling movement, the end portion 26 of the tubular connector 25 slides along the groove 37.

The cover 23 comprises a projecting tooth 27 that, in the coupled condition, closes the mouth of the groove 37.

The seat 10 in the outer wall 11 of the machine body comprises an upper portion for receiving the milk frothing device 3 and a lower portion for receiving the milk container 2. The bottom of the seat 10 comprises a base 12 that forms a support for the bottom of the milk container 2 during use.

Figure 20:
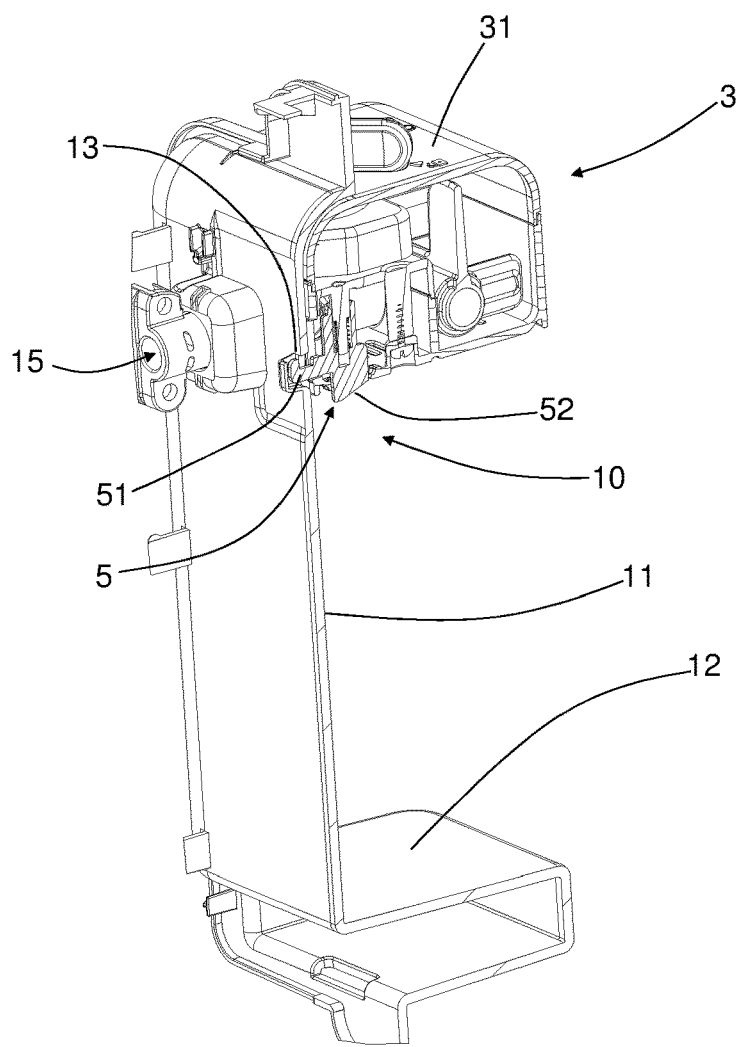
FIG. 20 is a perspective view of the portion of apparatus of FIG. 14, in section according to a section plane corresponding to the plane VIII-VIII in FIG. 3.
Figure 21:
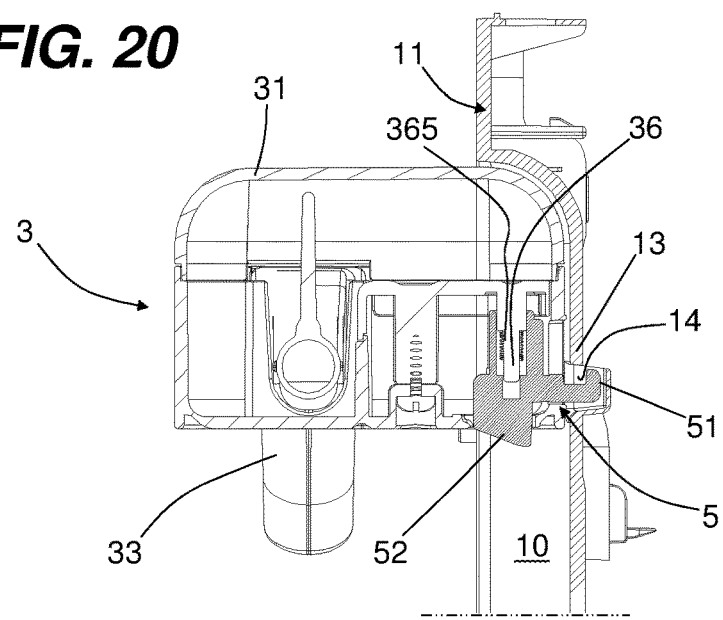
FIG. 21 is an enlarged side view of a detail of the portion of apparatus of FIG. 14, in section according to a section plane corresponding to the plane IX-IX in FIG. 3.

The apparatus 1 also comprises a locking member 5 for locking the milk frothing device 3 in the mounted condition in the seat 10. The locking member 5 may adopt an active condition (shown, for example, in FIGS. 8 and 9), in which the locking member 5 constrains the milk frothing device 3 to the machine body and prevents removal of the milk frothing device 3 from the seat 10. The locking member 5 may also adopt an inactive condition (shown, for example, in FIGS. 20 and 21), in which the locking member 5 releases the milk frothing device 3 and allows removal of the milk frothing device 3 from the seat 10.

According to an aspect on which this invention is based, the condition of the locking member 5 is determined by the milk container 2, which interacts with the locking member 5, determining its condition depending on the position of the milk container 2 relative to the milk frothing device 3 and/or to the seat 10.

In particular, when the milk container 2 is coupled to the milk frothing device 3 and the latter is in the mounted condition in the seat 10 (practically, when the apparatus 1 is in the condition suitable for producing frothed milk), the locking member 5 is kept in the active condition and, therefore, the milk frothing device 3 cannot be removed from the seat 10.

When the milk container 2 is removed from the milk frothing device 3 (and, therefore, the apparatus 1 is not in the condition for producing frothed milk), the locking member 5 can adopt the inactive condition and, therefore, the milk frothing device 3 can also be removed from the seat 10.

Therefore, in the apparatus 1 the milk frothing device 3 and the milk container 2 in the coupled condition are not simultaneously removable from the machine body. Instead, they can be removed one after the other.

This is useful, for example, during removal of the milk container 2 (for example, for filling it with milk), for preventing the user from also unintentionally removing the milk frothing device 3 and risking accidental exposure to a direct flow of steam from the steam dispenser 15.

After removal, the milk container 2 may again be coupled to the milk frothing device 3 while the latter is in the mounted condition in the seat 10.

The milk container 2 may be coupled to the milk frothing device 3 also when the latter has been removed from the seat 10. In this case, the assembly formed by the milk container 2 and the milk frothing device 3 can be handled as a single body. However, as already indicated above, they can only be removed from the seat 10 one after the other.

There may be present a return system which, when the milk container 2 is removed or uncoupled from the milk frothing device 3, is capable of automatically returning the locking member 5 to the inactive condition. In this way, after removal of the milk container 2, the milk frothing device 3 is also ready for removal. Alternatively, that return system may be absent and, therefore, the locking member 5 can be returned to the inactive condition by action by the user, after removal of the milk container 2. In this alternative, suitable measures could prevent the user from moving the locking member 5 towards the inactive condition when the milk container 2 is coupled to the milk frothing device 3.

Going back to the embodiment shown in the figures, in detail, the locking member 5 is a movable member that is shiftable between a first position, corresponding to the active condition, and a second position, corresponding to the inactive condition. In particular, the shifting of the locking member 5 between the first position and the second position may be a translation, or an angular shifting.

In the embodiment illustrated, the locking member 5 is mounted on the milk frothing device 3 and comprises a tooth 51 that, for example, is hook-shaped. The tooth 51 is intended to hook a contact element 13 present on the machine body. In detail, that contact element is or comprises an edge of a slit or slot 14 made in the outer wall 11 in the region of the seat 10. The tooth 51 is inserted in the slit or slot 14 when the milk frothing device 3 is in the mounted condition in the seat 10.

Figure 9:
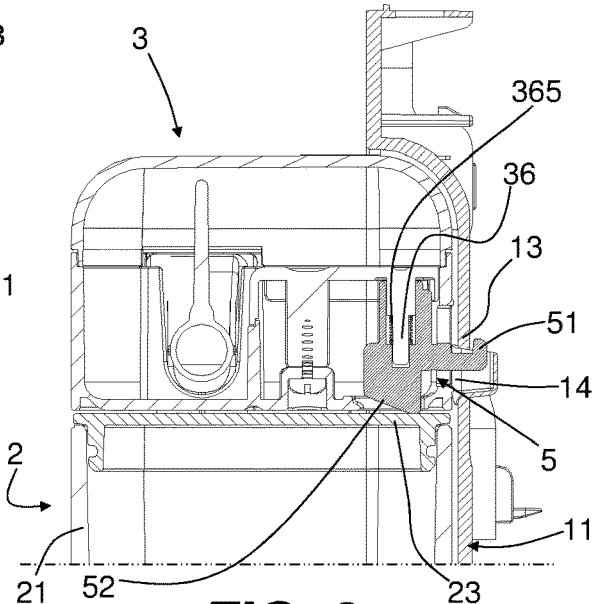
FIG. 9 is an enlarged side view of a detail of the portion of apparatus of FIG. 1, in section according to a section plane IX-IX in FIG. 3.
Figure 10:
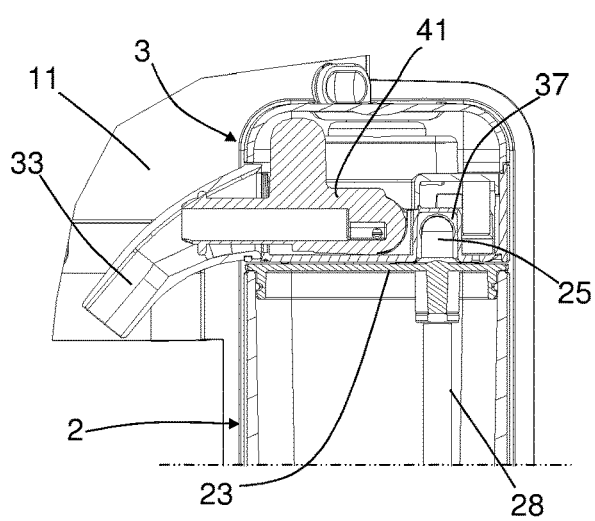
FIG. 10 is an enlarged front view of a detail of the portion of apparatus of FIG. 1, in section according to a section plane X-X in FIG. 3.
Figure 11:
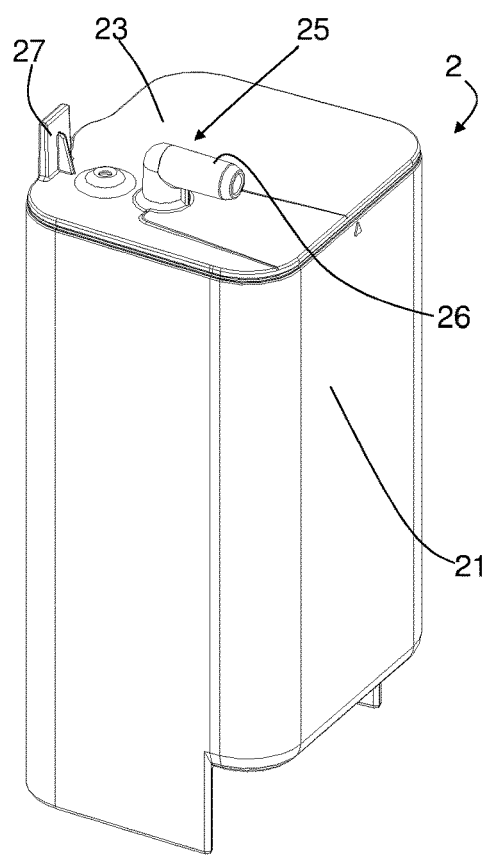
FIG. 11 is a perspective view of a milk container that is part of the apparatus of FIG. 1.
Figure 12:
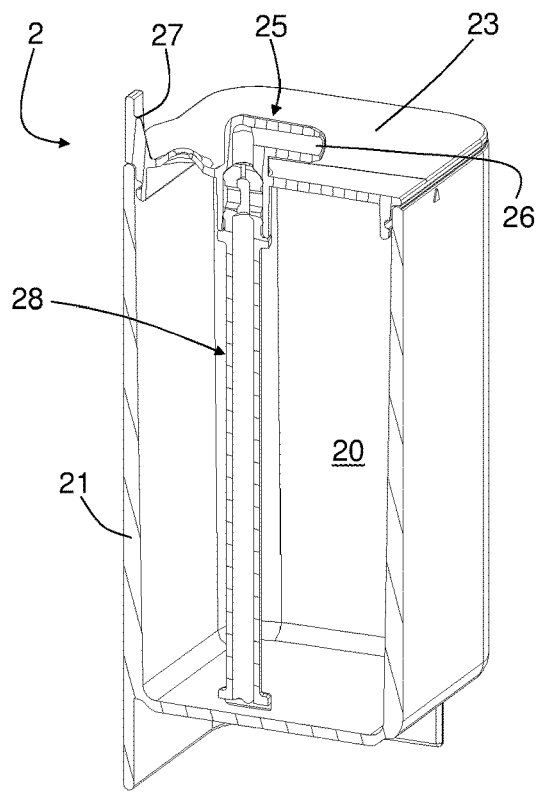
FIG. 12 is a perspective sectional view of the milk container of FIG. 11.
Figure 13:
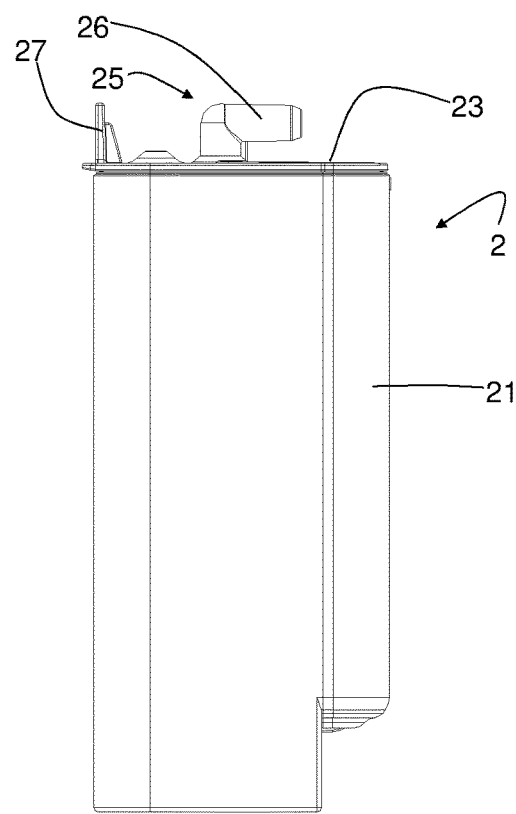
FIG. 13 is a side view of the milk container of FIG. 11.
Figure 14:
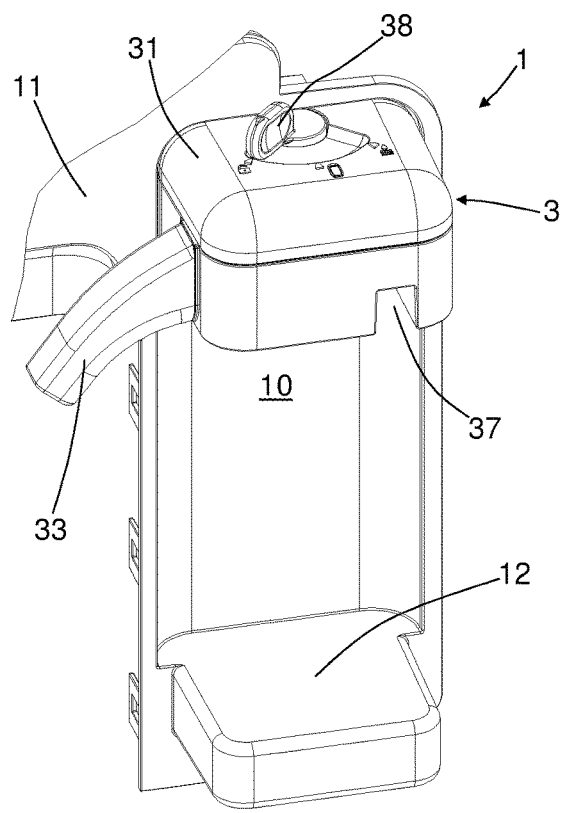
FIG. 14 is a perspective view of the portion of apparatus of FIG. 1, with the milk container removed.
Figure 15:
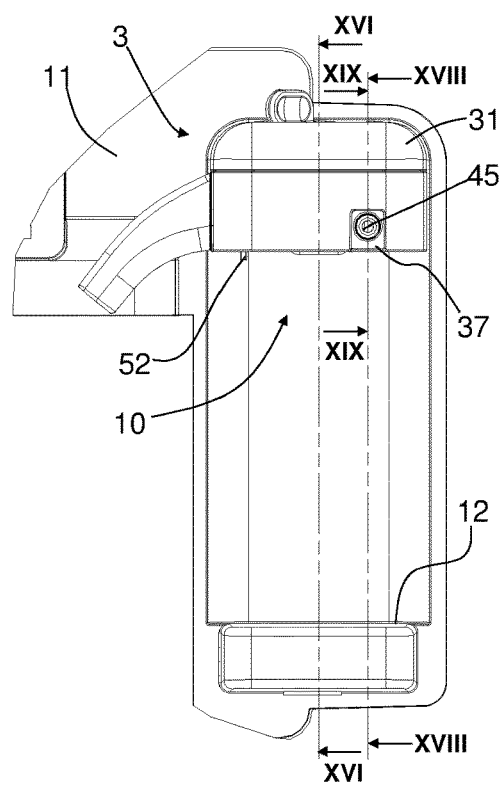
FIG. 15 is a front view of the portion of apparatus of FIG. 14.
Figure 16:
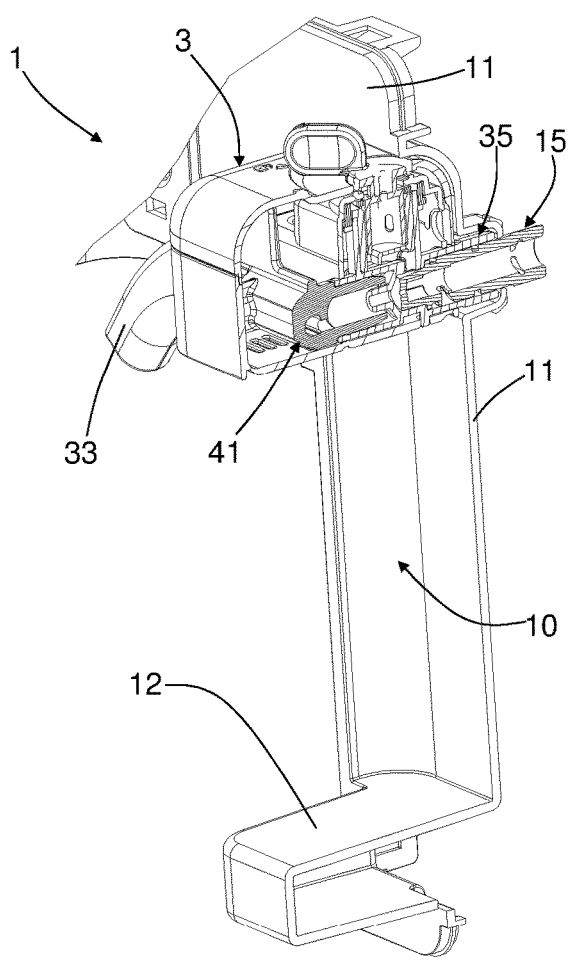
FIG. 16 is a perspective view of the portion of apparatus of FIG. 14, in section according to a section plane XVI-XVI in FIG. 15.
Figure 17:
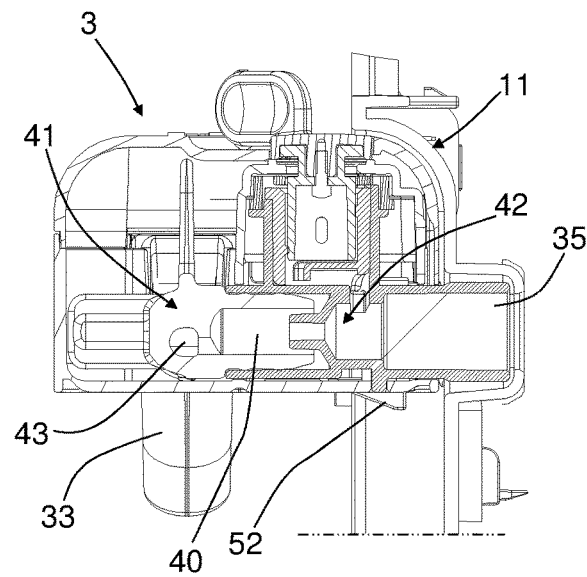
FIG. 17 is an enlarged side view of a detail of the sectional view of FIG. 16, with some parts removed.
Figure 19:
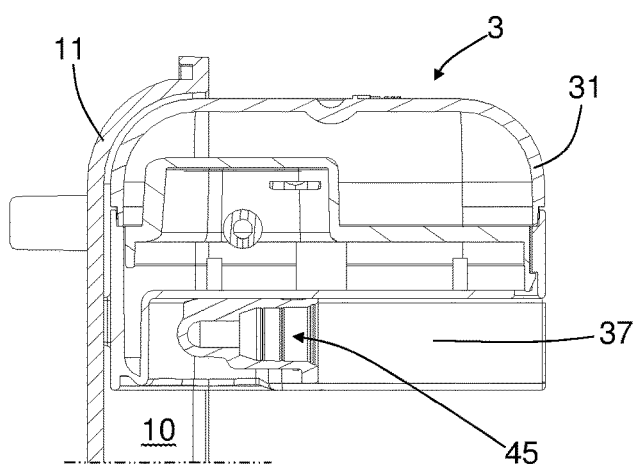
FIG. 19 is an enlarged side view of a detail of the portion of apparatus of FIG. 14, in section according to a section plane XIX-XIX in FIG. 15.
Figure 18:
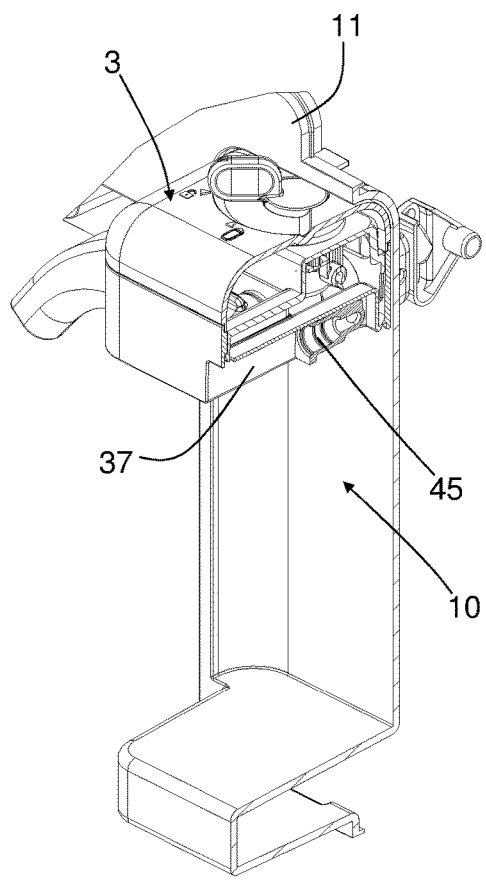
FIG. 18 is a perspective view of the portion of apparatus of FIG. 14, in section according to a section plane XVIII-XVIII in FIG. 15.

The first position of the locking member 5 corresponds to a condition in which the tooth 51 hooks the contact element 13 and, by preventing removal of the tooth 51 from the slot 14 in this way, locks the milk frothing device 3 in the seat 10 (see in particular FIG. 9). The second position of the locking member 5 corresponds to a condition in which the tooth 51 is unhooked from the contact element 13 and, therefore, does not prevent removal of the milk frothing device 3 (see in particular FIG. 21).

In detail, the milk container 2 is designed to force the locking member 5 towards the first position during the sliding movement relative to the milk frothing device 3 in the coupling direction. Practically, along a stretch of said sliding movement the milk container 2 acts (directly or with parts interposed) on the locking member 5 and shifts it towards the first position.

In the embodiment illustrated, the locking member 5 is slidably mounted on a guide 36 fixed to the body 31 of the milk frothing device 3. The guide 36 constrains the locking member 5 to a translating movement (in particular along a vertical line of translation) between the first position and the second position, and vice versa. For example, the guide 36 is cylindrical or tongue-shape and is slidably received at a corresponding elongate hollow in the locking member 5.

A return system, which in particular is a spring 365, is designed to push the locking member 5 towards the second position (that is to say, towards the inactive condition). The spring 365 is loaded when the locking member 5 is in the first position.

The locking member 5 also comprises a portion with a face 52 that is angled relative to the line of translation and is intercepted by the milk container 2 during said sliding movement. As shown for example in FIGS. 15, 17, 20 and 21, in the inactive condition the portion with the angled face 52 of the locking member 5 projects from the bottom of the box-shaped body 31 of the milk frothing device 3 and, therefore, is in a zone which is occupied by the cover 23 of the milk container 2 when the latter is coupled to the milk frothing device 3.

Practically, when the milk container 2 is coupled to the milk frothing device 3 the interaction between the angled face 52 and the cover 23 of the milk container 2 pushes the locking member 5 towards the first position. Basically, the portion with the angled face 52 is an element for controlling the position of the locking member 5.

Starting from a situation in which the milk container 2 and the milk frothing device 3 are removed from the machine body, the user first mounts the milk frothing device 3 in the seat 10, in particular inserting the milk frothing device 3 with a horizontal movement that causes the steam dispenser 15 to be inserted in the steam infeed duct 35. The tooth 51 goes into the slit 14, but is kept in the inactive condition by the spring 365.

Then, the user mounts the milk container 2, which is made to slide with a horizontal movement until it is completely inserted in the seat 10. During this movement, the end portion 26 of the pickup pipe 28 is inserted in the milk infeed duct 45 and the locking member 5 is pushed into the first position, locking the milk frothing device 3 and preventing it from being removed from the seat 10.

In this fully assembled condition, the apparatus 1 can be used for dispensing frothed milk.

When necessary, the user may remove the milk container 2 with a movement which is the reverse of that described above, whilst the milk frothing device 3 is retained in position by the locking member 5.

In particular, the parts may be designed so that, during said reverse movement, the locking member 5 is free to return to the second position only after the end portion 26 of the pickup pipe 28 has completely come out of the milk infeed duct 45. In that way, the milk frothing device 3 is released only when the milk container 2 is disengaged from the milk frothing device 3.

If necessary, the user may also remove the milk frothing device 3, or the latter may be left in position waiting to receive the milk container 2 again.

The removed milk container 2 may be placed in a refrigerator to preserve the milk contained in it during a period of time when it is not used. If necessary, the removed milk frothing device 3 may also be placed in a refrigerator. The components of the milk frothing device 3 and/or of the milk container 2 that are intended to make contact with the milk may be completely dismountable to allow easier cleaning of them.

In one embodiment, the apparatus 1 also comprises an infusion chamber (not illustrated) for making a second beverage, in particular for making coffee, and a respective dispensing spout (also not illustrated) for dispensing the second beverage. The infusion chamber and the other parts necessary for making the second beverage (for example, a pump and a water heater) are housed in the machine body. This invention concerns in particular the aspects relating to making frothed milk, whilst the aspects relating to making a beverage by infusion may be implemented as in prior art apparatuses and, therefore, they are not described in further detail herein.

In that embodiment of the apparatus 1, combined use of the milk frothing device 3 and of the infusion chamber allows, for example, a cappuccino (i.e., a beverage containing coffee and frothed milk) to be made.

In an alternative embodiment, the locking member 5 is at least partly elastically deformable. In that case, in place of the spring 365, the return system for returning to the inactive condition may consist of an elastically deformable portion of the locking member 5.

In an alternative embodiment, the locking member 5 is part of a mechanism comprising a control element that is a part separate from the locking member 5. The control element is designed to interact with the milk container 2 and is operatively connected to the locking member 5 for bringing the latter into the active condition when the milk container 2 is coupled to the milk frothing device 3.

In an alternative embodiment, the locking member 5 is mounted on the machine body, in the region of the seat 10, and in particular a tooth 51 of the locking member 5 is intended to hook a contact element that is present on the milk frothing device 3. For example, in this case the locking member 5 can be shifted to the active condition by a control element that is also located in the region of the seat 10 and interacts with the milk container 2 when the latter is in the seat 10.

In other alternative embodiments, the locking member could be made differently and operate based on a physical principle different to that described above. For example, the locking member could be an electromagnet that is turned on or off based on the position of the milk container 2.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus (1) for making a beverage, in particular a beverage containing milk, the apparatus (1) comprising a machine body, a milk container (2), a milk frothing device (3) designed to mix milk with air and steam to obtain frothed milk, the machine body housing a boiler for producing steam, an outer wall (11) of the machine body being provided with a seat (10) for receiving the milk frothing device (3), the milk frothing device (3) being removably mountable in said seat (10), in the mounted condition the milk frothing device (3) being in communication with the boiler to receive steam, the milk container (2) being removably couplable to the milk frothing device (3), in the coupled condition the milk frothing device (3) being in communication with the milk container (2) to receive milk, the apparatus (1) comprising a locking member (5) for locking the milk frothing device (3) in the mounted condition, the locking member (5) being able to adopt an active condition, in which the locking member (5) constrains the milk frothing device (3) to the machine body and prevents removal of the milk frothing device (3) from the seat (10), and an inactive condition, in which the locking member (5) releases the milk frothing device (3) to allow removal of the milk frothing device (3) from the seat (10), the milk container (2) interacting with the locking member (5) in such a way that, when the milk container (2) is coupled to the milk frothing device (3) in the mounted condition, the locking member (5) is kept in the active condition, and in such a way that, when the milk container (2) is uncoupled from the milk frothing device (3), the locking member (5) may adopt the inactive condition, whereby the milk frothing device (3) and the milk container (2) in the coupled condition are not simultaneously removable from the machine body.

2. The apparatus (1) according to claim 1, wherein, in the coupled condition, the milk frothing device (3) is at the top of the milk container (2) and is positioned above a cover (23) of the milk container (2).

3. The apparatus (1) according to claim 1, wherein, when the milk frothing device (3) is mounted on the machine body, the milk container (2) is couplable to, or uncouplable from, the milk frothing device (3) with a substantially horizontal translating movement.

4. The apparatus (1) according to claim 1, wherein the milk frothing device (3) comprises a manifold (41) having a frothing chamber (40) that is connected to an air infeed duct (48), to a milk infeed duct (45) and to a nozzle (42) for the steam, wherein, in the mounted and coupled condition, the milk infeed duct (45) is in communication with the milk container (2) and the nozzle (42) is in communication with the boiler, whereby, in use, a flow of steam in the nozzle (42) creates a pressure drop that sucks milk and air into the frothing chamber (40), thereby obtaining mixing of milk with air and steam.

5. The apparatus (1) according to claim 1, wherein the milk frothing device (3) comprises a dispensing spout (33) for dispensing frothed milk.

6. The apparatus (1) according to claim 1, wherein the machine body also houses an infusion chamber for making a second beverage, in particular for making coffee, the apparatus comprising a respective dispensing spout for dispensing said second beverage.

7. The apparatus (1) according to claim 1, comprising a return system (365) which, when the milk container (2) is uncoupled from the milk frothing device (3), is designed to automatically return the locking member (5) to the inactive condition.

8. The apparatus (1) according to claim 7, wherein, when the milk frothing device (3) is mounted on the machine body, the milk container (2) is couplable to, or uncouplable from, the milk frothing device (3) with a substantially horizontal translating movement.

9. The apparatus (1) according to claim 7, wherein the milk frothing device (3) comprises a manifold (41) having a frothing chamber (40) that is connected to an air infeed duct (48), to a milk infeed duct (45) and to a nozzle (42) for the steam, wherein, in the mounted and coupled condition, the milk infeed duct (45) is in communication with the milk container (2) and the nozzle (42) is in communication with the boiler, whereby, in use, a flow of steam in the nozzle (42) creates a pressure drop that sucks milk and air into the frothing chamber (40), thereby obtaining mixing of milk with air and steam.

10. The apparatus (1) according to claim 7, wherein the locking member (5) is shiftable between a first position corresponding to the active condition and a second position corresponding to the inactive condition.

11. The apparatus (1) according to claim 10, wherein the locking member (5) is mounted on one of either the milk frothing device (3) or the machine body, the locking member (5) comprising a tooth (51) that is intended to hook a contact element (13) present on the other of either the milk frothing device (3) or the machine body, the first position corresponding to a hooking between the tooth (51) and the contact element (13), the second position corresponding to an unhooking of the tooth (51) from the contact element (13).

12. The apparatus (1) according to claim 10, the milk container (2) and the milk frothing device (3) being couplable by a sliding movement of one relative to the other, the milk container (2) being designed to force the locking member (5) towards the first position in a stretch of said sliding movement.

13. The apparatus (1) according to claim 1, wherein the locking member (5) is shiftable between a first position corresponding to the active condition and a second position corresponding to the inactive condition.

14. The apparatus (1) according to claim 13, wherein the shifting of the locking member (5) between the first position and the second position is an angular shifting or a translation.

15. The apparatus (1) according to claim 13, the milk container (2) and the milk frothing device (3) being couplable by a sliding movement of one relative to the other, the milk container (2) being designed to force the locking member (5) towards the first position in a stretch of said sliding movement.

16. The apparatus (1) according to claim 13, wherein, in the coupled condition, the milk frothing device (3) is at the top of the milk container (2) and is positioned above a cover (23) of the milk container (2).

17. The apparatus (1) according to claim 13, wherein, when the milk frothing device (3) is mounted on the machine body, the milk container (2) is couplable to, or uncouplable from, the milk frothing device (3) with a substantially horizontal translating movement.

18. The apparatus (1) according to claim 13, wherein the milk frothing device (3) comprises a manifold (41) having a frothing chamber (40) that is connected to an air infeed duct (48), to a milk infeed duct (45) and to a nozzle (42) for the steam, wherein, in the mounted and coupled condition, the milk infeed duct (45) is in communication with the milk container (2) and the nozzle (42) is in communication with the boiler, whereby, in use, a flow of steam in the nozzle (42) creates a pressure drop that sucks milk and air into the frothing chamber (40), thereby obtaining mixing of milk with air and steam.

19. The apparatus (1) according to claim 13, wherein the locking member (5) is mounted on one of either the milk frothing device (3) or the machine body, the locking member (5) comprising a tooth (51) that is intended to hook a contact element (13) present on the other of either the milk frothing device (3) or the machine body, the first position corresponding to a hooking between the tooth (51) and the contact element (13), the second position corresponding to an unhooking of the tooth (51) from the contact element (13).

20. The apparatus (1) according to claim 19, the contact element (13) comprising an edge of a slit or slot (14) in which the tooth (51) is inserted when the milk frothing device (3) is in the mounted condition.

* * * * *